United States Patent [19]

Dhein et al.

[11] 4,418,174

[45] Nov. 29, 1983

[54] PROCESS FOR THE PREPARATION OF POLYESTERS USING MANNITOL OR SORBITOL DERIVATIVES, MIXTURES OF POLYESTERS AND THESE MANNITOL OR SORBITOL DERIVATIVES AND THE USE THEREOF FOR THE PRODUCTION OF AQUEOUS STOVING LACQUERS

[75] Inventors: Rolf Dhein, Krefeld; Lothar Bäcker, Dormagen; Jochen Schoeps, Krefeld, all of Fed. Rep. of Germany

[73] Assignee: Bayer Aktiengesellschaft, Leverkusen, Fed. Rep. of Germany

[21] Appl. No.: 366,464

[22] Filed: Apr. 8, 1982

[30] Foreign Application Priority Data

Apr. 14, 1981 [DE] Fed. Rep. of Germany ....... 3115071

[51] Int. Cl.$^3$ .................... C08L 51/00; C08L 67/00
[52] U.S. Cl. .................... 524/539; 525/443; 525/514
[58] Field of Search ............ 524/539; 525/443, 514

[56] References Cited

U.S. PATENT DOCUMENTS

| | | | |
|---|---|---|---|
| 2,981,703 | 4/1961 | Hoenel | 524/539 |
| 3,862,072 | 1/1975 | Sekmakas | 524/539 |
| 4,171,294 | 10/1979 | Dhein et al. | 524/539 |
| 4,179,428 | 12/1979 | Zückert et al. | 524/539 |

Primary Examiner—Lucille M. Phynes
Attorney, Agent, or Firm—Connolly and Hutz

[57] ABSTRACT

Dianhydromannitol, dianhydrosorbitol, dianhydromannitol semi-esters and dianhydrosorbitol semi-esters are outstanding raw materials for the production of aqueous stoving lacquers based on polyesters.

2 Claims, No Drawings

PROCESS FOR THE PREPARATION OF POLYESTERS USING MANNITOL OR SORBITOL DERIVATIVES, MIXTURES OF POLYESTERS AND THESE MANNITOL OR SORBITOL DERIVATIVES AND THE USE THEREOF FOR THE PRODUCTION OF AQUEOUS STOVING LACQUERS

This invention relates to a process for the preparation of polyesters using dianhydromannitol, dianhydrosorbitol, dianhydromannitol semi-esters and/or dianhydrosorbitol semi-esters, to mixtures of polyesters and dianhydromannitol, dianhydrosorbitol, dianhydromannitol semi-esters and/or dianhydrosorbitol semi-esters or the salts thereof, and to the use thereof for the production of aqueous stoving lacquers. The polyesters which are prepared according to the present invention and the mixtures of the present invention are most suitable as a binder for aqueous stoving lacquers.

Formerly, polyesters having high acid numbers were neutralised and were thus rendered water-dilutable (British Pat. No. 356,738), but lacquerings were then obtained which did not have an adequate weather and corrosion resistance. Conventional water-dilutable polyesters currently in use have acid numbers of at least about 40, preferably from about 45 to 65, and hydroxyl numbers of from about 150 to about 250, and avoid this disadvantage. The free hydroxyl groups may be cross-linked by reacting with aminoplast resins (Austrian Pat. No. 180,407). In order to improve solubility and viscosity, organic auxiliary solvents, for example, water-miscible alcohols, esters and ketones are for the most part also used. Since the conventional organic auxiliary solvents leave the lacquer film during the hardening operation, it is sensible in terms of ecology and economy to look for polyesters which may be processed into qualitatively high-grade lacquerings without the use of organic auxiliary solvents.

Surprisingly, it has now been found that very reactive water-dilutable polyesters may be prepared by using dianhydromannitol, dianhydrosorbitol, dianhydromannito semi-esters and/or dianhydrosorbitol semi-esters and these polyesters may be processed into weather- and corrosion-resistant coatings even without any organic solvent. Above all, it should be noted here that it is possible to render unnecessary the use of organic auxiliary solvents with water-dilutable polyesters which are insoluble in water and have acid numbers of about 10 by a reaction with dianhydromannitol- or dianhydrosorbitol semi-esters and by subsequent neutralisation.

Furthermore, it has been found that dianhydromannitol, dianhydrosorbitol, dianhydromannitol semi-esters and dianhydrosorbitol semi-esters or the salts thereof are outstanding reactive diluents for polyesters. The term "reactive diluents" is understood to mean low-viscosity materials which dilute resinous binders and thus impart to the lacquer the viscosity which is required for its application, which contain functional groups capable of mixed polymerisation or mixed condensation with the lacquer resin, and which, during the hardening procedure, mainly become a component of the hardened lacquer film, depending in each case on the volatility thereof. Dianhydromannitol, dianhydrosorbitol, dianhydromannitol semi-esters and dianhydrosorbitol semi-esters are incorporated into the coatings without appreciable losses. Used as a reactive diluent in aqueous polyester lacquers, they allow the use of other organic solvents to be relinquished, surprisingly even when using water-insoluble polyesters. Their outstanding water-solubility allows the production of lacquers with a high solids content. Moreover, polyester coatings which are produced using dianhydromannitol, dianhydrosorbitol, dianhydromannitol semi-esters and/or dianhydrosorbitol semi-esters or the salts thereof as a reactive diluent show an extremely low chalking.

The present invention provides a process for the preparation of polyesters having an average molecular weight $\overline{M}_n$ of from 1,000 to 10,000, an acid number of from 1 to 100, preferably from 10 to 70, and a hydroxyl number of from 30 to 400, characterised in that from 5 to 50%, by weight, preferably from 10 to 30% by weight, based on the polyester starting components, of dianhydromannitol, dianhydrosorbitol, dianhydromannitol semi-esters and/or dianhydrosorbitol semi-esters are used.

The present invention also provides mixtures of:
(A) from 10 to 90% by weight, preferably from 30 to 60% by weight, of polyesters having an average molecular weight $\overline{M}_n$ of from 1,000 to 10,000,
(B) from 10 to 50% by weight of reactive diluent,
(C) up to 50% by weight of water, and
(D) from 0 to 40% by weight, preferably from 10 to 30% by weight, of aminoplast resin,
the percentages being based on the total of components A, B and D, characterised in that the reactive diluent B is dianhydromannitol, dianhydrosorbitol, a dianhydromannitol semi-ester and/or a dianhydrosorbitol semi-ester or a salt of these compounds or any mixture thereof.

The present invention also relates to the use of these mixtures for the production of aqueous stoving lacquers.

Dianhydromannitol and dianhydrosorbitol are bicyclic diethers which may be obtained from mannitol or sorbitol by splitting off 2 mols of water:

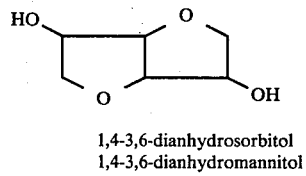

1,4-3,6-dianhydrosorbitol
1,4-3,6-dianhydromannitol

Both compounds are stereoisomers.

The terms "dianhydromannitol semi-esters" and "dianhydrosorbitol semi-esters" are understood to mean esters generally obtained from di-, tri- or tetra-carboxylic acid anhydrides having from 3 to 12 carbon atoms and dianhydromannitol or dianhydrosorbitol which each contain at least one free hydroxyl and carboxyl group, provided that they do not simultaneously contain more than one dianhydromannitol radical or dianhydrosorbitol radical and more than one di-, tri- or tetra-carboxylic acid radical. Preferred carboxylic acid anhydrides for the preparation of the dianhydromannitol semi-esters or dianhydrosorbitol semi-esters are tetra- and hexa-hydrophthalic acid anhydride, maleic acid anhydride, succinic acid anhydride, phthalic acid anhydride, trimellitic and pyromellitic acid anhydride. The semi-esters may also be formed from the anhydride and dianhydromannitol or dianhydrosorbitol in the presence of the polyester A.

The polyesters to be prepared using dianhydromannitol, dianhydrosorbitol, dianhydromannitol semi-esters and/or dianhydrosorbitol semi-esters and the polyesters A are polycondensates prepared from alcohols and carboxylic acids and/or the ester-forming derivatives thereof of the type defined, for example, in Römpp's Chemilexikon, Vol. 1, p. 202, Frankh'sche Verlagsbuchlandlung, Stuttgart, 1966 or as described by D. H. Solomon, in "The Chemistry of Organic Filmformers", P. 75–101, John Wiley & Sons Inc., New York 1967.

The polyesters A have hydroxyl numbers of from 30 to 400 and, before neutralisation, acid numbers of from 1 to 100, preferably from 10 to 70.

Alcohols which are preferred for the process according to the present invention and for the preparation of the polyesters A are, in addition to dianhydromannitol or dianhydrosorbitol, aliphatic, cycloaliphatic and/or araliphatic alcohols having from 1 to 6, preferably from 1 to 4, OH-groups bound to non-aromatic carbon atoms and from 1 to 24 carbon atoms per molecule, for example, glycols such as ethylene glycol, propylene glycol, butane diols, neopentyl glycol, hexane diols; ether alcohols such as di- and triethylene glycols; ethoxylated bisphenols; perhydrogenated bisphenols; also trimethylolethane, trimethylolpropane, glycerine, pentaerthritol, dipentaerythritol, mannitol and sorbitol; and monohydric chain-terminating alcohols, such as propanol, butanol, cyclohexanol and benzyl alcohol.

Acid components which are preferred for the process according to the present invention and for the preparation of the polesters A are aliphatic, cycloaliphatic, saturated or unsaturated and/or aromatic multi-basic caboxylic acids, preferably di-, tri- and tetra-carboxylic acids having from 4 to 12 carbon atoms per molecule or the derivatives thereof which are capable of esterification (for example, anhydrides or esters), for example, phthalic acid anhydride, isophthalic acid, terephthalic acid, tetra-hydro- and hexahydrophthalic acid anhydride, trimellitic acid anhydride, pyromellitic acid anhydride, maleic acid anhydride, adipic acid, azelaic acid and succinic acid anhydride, also halogenated acids, such as chlorophthalic acids and hexachloroendomethylenetetrahydrophthalic acid.

Monocarboxylic acids which are preferred for the process according to the present invention and for the preparation of the polyesters A are aliphatic, cycloaliphatic, saturated and unsaturated and aromatic monocarboxylic acids having from 6 to 24 carbon atoms per molecule, such as benzoic acid, butylbenzoic acic, toluic acid, hexahydrobenzoic acid, abietic acid, lactic acid and fatty acids and esters thereof, such as linseed oil, soy oil, wood oil, safflower oil, castor oil, dehydrated castor oil, cottonseed oil, arachis oil, fatty acid of tall oil, linseed oil, soy oil, wood oil, safflower oil and dehydrated castor oil and products obtained from natural, unsaturated oils or fatty acids by conjugation or isomerisation; suitable saturated fatty acids are, for example, coconut oil fatty acids and α-ethylhexanoic acid.

The average molecular weight of the polyesters to be prepared according to the present invention and of the polyesters A is from 1,000 to 10,000 (determined by vapour pressure osmometry in dioxane and acetone for molecular weights of up to 5,000, and where there are differing values, the lower value is considered as being correct; for molecular weights of more than 5,000, determined by membrane osmometry in acetone).

Polyesters A which are particularly preferred are those which may be obtained by reacting polyesters containing hydroxyl groups with carboxylic acid anhydrides. Carboxylic acid anhydrides which are preferred for this purpose are the anhydrides mentioned above for the preparation of the dianhydromannitol semi-esters or dianhydrosorbitol semi-esters. The most preferred anhydride is tetrahydrophthalic acid anhydride.

Melamine-formaldehyde or urea-formaldehyde condensation products, for example, are to be considered as aminoplast resins D. Melamine resins are all conventional non-etherified melamine-formaldehyde condensates or these condensates etherified with saturated mono-alcohols having from 1 to 4 carbon atoms, as described, for example, in French Pat. No. 943,411 or by D. H. Solomon in "The Chemistry of Organic Filmformers", 235–240, John Wiley & Sons, Inc., New York, 1967. However, the melamine resins may also be partly or completely replaced by other cross-linkable aminoplasts, as described, for example, in "Methoden der Organischen Chemie" (Houben-Weyl), volume 14/2, part 2, 4th Edition, Georg Thieme Verlag, Stuttgart, 1963, 319 ff.

Organic or inorganic bases are suitable for the neutralisation of the polyesters to be prepared according to the present invention of the polyesters A, and of the dianhydromannitol semi-esters and dianhydrosorbitol semi-esters. The degree of neutralisation is usually from 70 to 100%. If possible, no more base should be added than an amount equivalent to the free carboxyl groups. Examples of preferred bases are as follows: ammonia, primary, secondary and tertiary amines such as ethylamine, diethylamine, triethylamine, dimethylethanolamine, mono- di and tri-ethanolamine, dimethylaminopropanol and optionally alkali metal hydroxides.

In addition to dianhydromannitol, dianhydrosorbitol, dianhydromannitol semi-esters or dianhydrosorbitol semi-esters, other reactive diluents may naturally also be used, for example, water-soluble, glycols, ether glycols and/or glycerine. The quantities are usually not more than 10% by weight, based on the total of components A, B and D.

Outstanding stoving lacquers may be produced from the polyesters prepared according to the present invention and from the mixtures of the present invention. These lacquers may contain the conventional pigments and lacquer aids; pigments, for example, titanium dioxide, iron oxides, chromium oxides, zinc sulphide, carbon black, aluminium bronze; fillers such as silica and sulphates.

The lacquers may be applied, for example, by spraying, dipping, pouring, brushing or according to the "coil-coat" process. The lacquers may be hardened at from 80° to 230° C.

The parts specified in the following Examples are parts by weight; percentages are based on weight.

EXAMPLES

Example 1

551 parts of propanediol-1,2, 369.5 parts of trimethylolpropane, 747.3 parts of adipic acid and 506.2 parts of phthalic acid anhydride are condensed under an inert gas atmosphere at 230° C. up to a viscosity corresponding to an outflow time of 150 seconds (measured according to DIN 53 211, 60% in dimethylformamide). During this process, the acid number falls to 10. The calculated hydroxyl number was 165. The resulting product is termed "polyester A" in the following.

192.8 parts of polyester A are stirred for 20 hours with 75.5 parts of the semi-ester prepared from equimolar quantities of dianhydrosorbitol and tetrahydrophthalic acid anhydride at 140° C., under an inert gas atmosphere at 130° C. During this time, the viscosity decreases to a value corresponding to an outflow time of 120 seconds (measured according to DIN 53 211, 60% in dimethylformamide) to 40 seconds. The reaction product has a total acid number of 60. A covering lacquer was produced according to the following formulation from the binder thus obtained:

| | |
|---|---|
| 25 | parts of binder, |
| 2.35 | parts of dimethylethanolamine, |
| 10.41 | parts of methylated methylolmelamine resin 80% in isopropanol, |
| 26.67 | parts of titanium dioxide, |
| 0.20 | parts of wetting agent based on fluoroalkane, 50% in water, and |
| 35.19 | parts of water. |

After adding a further 12.6 parts of water, the viscosity of the sprayable lacquer corresponded to an outflow time of 50 seconds (measured according to DIN 53 211). This lacquer had a pH of 8.1 and a solids content of 53.3%.

Coatings produced using this lacquer have good properties in terms of lacquer and are distinguished by good results in gloss, hardness and white shade, and by a high resistance to chalking.

Example 2

456.8 parts of propanediol-1,2, 875.7 parts of hexanediol-1,6, 685.6 parts of trimethylolpropane, 845.1 parts of adipic acid, 697.6 parts of azelaic acid and 939.2 parts of phthalic acid anhydride were polycondensed under an inert gas atmosphere, until the acid number was 1.5 and the viscosity corresponded to an outflow time of 134 seconds (measured according to DIN 53 211, 60% in dimethylformamide). In a further reaction stage, the resulting polyester was reacted with 650.6 parts of tetrahydrophthalic acid anhydride at 130° C., until the total acid number was 65 and the viscosity corresponded to an outflow time of 218 seconds (DIN 53 211, 60% in dimethylformamide). The reaction product was mixed with dianhydrosorbitol in a weight ratio of 2:1 at 70° C.; 90% of the free carboxyl groups were neutralised by dimethylethanolamine and the resin was diluted with water.

A lacquer was produced according to the following formulation from this concentrate (40% polyester, 20% dianhydrosorbitol, 40% water):

| | |
|---|---|
| 42.09 | parts of concentrate, |
| 10.41 | parts of methylated methylolmelamine resin, 80% in isopropanol, |
| 26.67 | parts of titanium dioxide, |
| 0.20 | parts of wetting agent based on fluoroalkane, 50% in water, and |

| | |
|---|---|
| 20.63 | parts of water. |

The resulting lacquer had a pH of 8.3, a solids content of 60% and a viscosity corresponding to an outflow time of 14 seconds (DIN 53 211).

Example 3

648.6 parts of propanediol-1,2, 675.1 parts of trimethylolpropane, 1365.8 parts of adipic acid, 924.9 parts of phthalic acid anhydride and 685.5 parts of dianhydrosorbitol were polycondensed at a temperature of 200° C. up to an acid number of 14.1. During this process, the viscosity reached a value corresponding to an outflow time of 138 seconds (DIN 53 211, 60% in dimethylformamide). In a second stage, the material was re-acidified up to a total acid number of 77.9 by semi-ester formation with tetrahydrophthalic acid anhydride. The viscosity of the resulting reaction product corresponded to an outflow time of 346 seconds (DIN 53 211, 60% in dimethylformamide). The free carboxylic groups were neutralised by the equivalent quantity of dimethylethanolamine. The resin was then diluted with water to a solids content of 86.6%. A spray lacquer of the following composition was produced from this concentrate:

| | |
|---|---|
| 28.87 | parts of concentrate, |
| 10.41 | parts of methylated methylolmelamine resin, 80% in isopropanol, |
| 26.67 | parts of titanium dioxide, |
| 0.20 | parts of wetting agent based on fluoroalkane, 50% in water, and |
| 20.63 | parts of water. |

The lacquer was adjusted to a spray viscosity corresponding to an outflow time of 51 seconds (DIN 53 211) using a further 5.6 parts of water. The solids content was 56.8%.

The covering lacquers produced therewith were distinguished by a good gloss, elasticity, white shade and gloss preservation.

We claim:

1. Mixtures of:
  (A) from 10 to 90% by weight, of polyesters having an average molecular weight $\overline{M}_n$ of from 1,000 to 10,000,
  (B) from 10 to 50% by weight of reactive diluent,
  (C) up to 50% by weight of water, and
  (D) from 0 to 50% by weight of aminoplast resin,
the percentages being based on the total of the components A, B and D, characterised in that the reactive diluent B is dianhydromannitol, dianhydrosorbitol, dianhydromannitol semi-ester and/or dianhydrosorbitol semi-ester or a salt of these compounds.

2. Mixtures according to claim 1, characterised in that the dianhydromannitol semi-ester or dianhydrosorbitol semi-ester is selected from the group consisting of dianhydromannitol- or dianhydrosorbitol tetra- and hexahydrophthalic acid ester, maleic acid ester, succinic acid ester, phthalic acid ester, trimellitic acid ester and pyromellitic acid ester.

* * * * *